US011182363B2

(12) United States Patent
Reed et al.

(10) Patent No.: US 11,182,363 B2
(45) Date of Patent: Nov. 23, 2021

(54) DATA VALIDATION IN COPY REPOSITORIES

(71) Applicant: International Business Machines Corporation, Armonk, NY (US)

(72) Inventors: David C. Reed, Tucson, AZ (US); Gregory E. McBride, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 322 days.

(21) Appl. No.: 16/023,008

(22) Filed: Jun. 29, 2018

(65) Prior Publication Data

US 2020/0004850 A1    Jan. 2, 2020

(51) Int. Cl.
| | | |
|---|---|---|
| *G06F 16/21* | (2019.01) | |
| *G06F 11/34* | (2006.01) | |
| *H04L 29/08* | (2006.01) | |
| *G06F 11/14* | (2006.01) | |
| *G06F 16/27* | (2019.01) | |
| *G06F 16/23* | (2019.01) | |

(52) U.S. Cl.
CPC ........ *G06F 16/219* (2019.01); *G06F 11/1446* (2013.01); *G06F 11/3476* (2013.01); *G06F 16/2329* (2019.01); *G06F 16/27* (2019.01); *H04L 67/1097* (2013.01); *G06F 2201/835* (2013.01)

(58) Field of Classification Search
CPC .... G06F 16/219; G06F 16/27; G06F 16/2329; G06F 11/3476; G06F 11/1446; G06F 2201/835; G06F 11/1471; G06F 11/1469; G06F 11/1448; H04L 67/1097; H04L 67/1095

See application file for complete search history.

(56) References Cited

U.S. PATENT DOCUMENTS

| | | | |
|---|---|---|---|
| 6,151,608 A | 11/2000 | Abrams | |
| 6,449,623 B1 | 9/2002 | Bohannon et al. | |
| 6,799,189 B2 | 9/2004 | Huxoll | |
| 7,447,850 B1 * | 11/2008 | Del Rosso | G06F 11/1471 711/156 |
| 7,647,526 B1 | 1/2010 | Taylor | |

(Continued)

OTHER PUBLICATIONS

Techterms.com, "Snapshot", 1 page, Jun. 7 (Year: 2012).*

(Continued)

*Primary Examiner* — Albert M Phillips, III
(74) *Attorney, Agent, or Firm* — Nelson IP; Daniel P. Nelson

(57) ABSTRACT

A method for validating data in a copy repository is disclosed. In one embodiment, such a method includes establishing a template that designates valid fields within a data set, as well as valid values and types of data within the fields. The method further establishes a timeframe over which to validate versions of the data set residing in a copy repository. Starting at a first end of the timeframe and proceeding to a second end, the method validates each version of the data set residing in the copy repository. To accomplish this, the method configures a computing system to a state that existed when the version was created in the copy repository. The method then opens the version on the computing system and validates the version against the template. A corresponding system and computer program product are also disclosed.

20 Claims, 12 Drawing Sheets

(56) References Cited

U.S. PATENT DOCUMENTS

| | | | |
|---|---|---|---|
| 7,716,435 B1* | 5/2010 | Allen | G06F 11/1458 711/154 |
| 7,877,360 B2 | 1/2011 | Rohit et al. | |
| 7,904,406 B2 | 3/2011 | Kumbi et al. | |
| 8,161,012 B1* | 4/2012 | Gerraty | G06F 21/53 707/687 |
| 8,386,440 B2 | 2/2013 | Lomet et al. | |
| 8,402,309 B2* | 3/2013 | Timashev | G06F 9/44589 714/15 |
| 8,560,772 B1 | 10/2013 | Piszczek et al. | |
| 8,707,299 B1* | 4/2014 | Bezbaruah | G06F 9/452 718/1 |
| 8,819,042 B2 | 8/2014 | Samudrala et al. | |
| 9,002,798 B1* | 4/2015 | Raj | G06F 16/128 707/654 |
| 9,047,216 B2 | 6/2015 | Soran et al. | |
| 9,268,797 B2 | 2/2016 | Whitehead et al. | |
| 9,430,333 B2 | 8/2016 | D'Amato et al. | |
| 9,619,341 B2 | 4/2017 | Prahlad et al. | |
| 9,760,697 B1 | 9/2017 | Walker | |
| 2006/0101097 A1* | 5/2006 | Barboi | G06F 11/1471 |
| 2006/0218439 A1* | 9/2006 | Carter-Schwendler | G06F 11/1461 714/12 |
| 2006/0224636 A1* | 10/2006 | Kathuria | G06F 11/1471 |
| 2007/0033356 A1 | 2/2007 | Erlikhman | |
| 2007/0288247 A1 | 12/2007 | Mackay | |
| 2008/0195676 A1* | 8/2008 | Lyon | G06F 11/1469 |
| 2009/0106603 A1* | 4/2009 | Dilman | G06F 11/0727 714/42 |
| 2010/0043073 A1* | 2/2010 | Kuwamura | G06F 21/56 726/24 |
| 2010/0185589 A1* | 7/2010 | Clarke | G06F 11/1469 707/674 |
| 2011/0225128 A1* | 9/2011 | Jarrett | G06F 8/61 707/692 |
| 2011/0246981 A1* | 10/2011 | Braun | G06F 9/4416 717/175 |
| 2012/0124007 A1* | 5/2012 | Sten | G06F 11/1448 707/685 |
| 2013/0073819 A1* | 3/2013 | Havewala | G06F 16/128 711/162 |
| 2013/0124486 A1* | 5/2013 | Helman | G06F 11/1435 707/692 |
| 2013/0132778 A1* | 5/2013 | Dagan | H04L 41/065 714/37 |
| 2013/0326279 A1* | 12/2013 | Chavda | G06F 11/3672 714/41 |
| 2015/0317213 A1* | 11/2015 | Lin | G06F 11/14 707/679 |
| 2015/0370654 A1 | 12/2015 | Bish et al. | |
| 2016/0124990 A1* | 5/2016 | Suggs | G06F 16/1844 707/626 |
| 2016/0321455 A1* | 11/2016 | Deng | G06F 21/577 |
| 2017/0123946 A1 | 5/2017 | Wu et al. | |
| 2017/0192850 A1 | 7/2017 | Dachere | |
| 2017/0220426 A1* | 8/2017 | Sankar | G06F 11/1004 |
| 2017/0242751 A1* | 8/2017 | Czezatke | G06F 11/1451 |
| 2017/0357551 A1 | 12/2017 | Zacks et al. | |

OTHER PUBLICATIONS

Bairavasundaram, LN, et al., "An Analysis of Data Corruption in the Storage Stack," ACM Transactions on Storage (TOS) vol. 4, Issue 3, Article No. 8, Nov. 2008.

Wang, P., et al., "Understanding Real World Data Corruptions in Cloud Systems," 2015 IEEE International Conference on Cloud Engineering (IC2E), Mar. 2015.

IP.com, "Diagnosis Tool for Identifying Data Corruption Using Historical Buffer Tracking," ip.com No. IPCOM000146224D, Feb. 2007.

IP.com, "A Cognitive Method to Help Identify the Correct Data Block Out of Multiple Inconsistent Data Blocks on a Distributed Storage System," ip.com No. IPCOM000251909D, Dec. 2017.

IP.com, "Method to Enable Data Integrity Check at Secondary Site During Replication," ip.com No. IPCOM000225890D, Mar. 2013.

Maunder, C., et al., "The Test Access Port and Boundary-Scan Architecture," IEEE Computer Society Press Los Alamitos, CA, 1990.

Dao, D., et al., "Live Debugging of Distributed Systems," '09 Proceedings of the 18th International Conference on Compiler Construction: Held as Part of the Joint European Conferences on Theory and Practice of Software, Mar. 2009.

No, J., "Snapshot-Based Data Recovery Approach," College of Electronics and Information Engineering, Sejong University, 2010.

* cited by examiner

DATA VALIDATION IN COPY REPOSITORIES

BACKGROUND

Field of the Invention

This invention relates to systems and methods for validating data in copy repositories.

Background of the Invention

Data is often one of an organization's most valuable assets. Accordingly, it is paramount that an organization protect its data, particularly its business-critical data. Statistics show that a high percentage of organizations, as high as fifty percent, are unable to recover from an event of significant data loss, regardless of whether the loss is the result of a virus, data corruption, physical disaster, software or hardware failure, human error, or the like. At the very least, significant data loss can result in lost income, missed business opportunities, and/or substantial legal liability. Accordingly, it is important that an organization implement adequate policies and procedures to prevent such losses from occurring. When data loss or corruption does occur, an organization needs effective tools to recover data, as well as identify the source and timing of the data loss or corruption to prevent it from happening again.

Frequently, an organization is unaware that data has become corrupted until some time after the corruption has occurred. The organization will often have no idea when the corruption occurred, which makes it extremely difficult to identify the source of the corruption, as well as take steps to prevent the corruption from occurring again. In some cases, the organization may not know the state or condition of the data prior to the corruption. In yet other cases, an organization may discover that a data breach occurred or likely occurred but not know whether data was changed or corrupted during the breach, or know the exact timing or events associated with the breach.

In view of the foregoing, what are needed are systems and methods to enable organizations to identify sources and timing of data corruption in order to recover the data and ideally prevent the corruption from happening again. Ideally, such systems and methods will take advantage of data copy repositories that store periodic snapshots of data. Further needed are systems and methods to determine changes to data, as well as timing associated with the changes, in association with a data breach. Yet further needed are systems and methods to validate data in copy repositories as a way to detect possible data corruption and/or verify the integrity of data.

SUMMARY

The invention has been developed in response to the present state of the art and, in particular, in response to the problems and needs in the art that have not yet been fully solved by currently available systems and methods. Accordingly, systems and methods have been developed to validate data in a copy repository. The features and advantages of the invention will become more fully apparent from the following description and appended claims, or may be learned by practice of the invention as set forth hereinafter.

Consistent with the foregoing, a method for validating data in a copy repository is disclosed. In one embodiment, such a method includes establishing a template that designates valid fields within a data set, as well as valid values and types of data within the fields. The method further establishes a timeframe over which to validate versions of the data set residing in a copy repository. Starting at a first end of the timeframe and proceeding to a second end, the method validates each version of the data set residing in the copy repository. To accomplish this, the method configures a computing system to a state that existed when the version was created in the copy repository. The method then opens the version on the computing system and validates the version against the template.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which.

DETAILED DESCRIPTION

Figure 1:
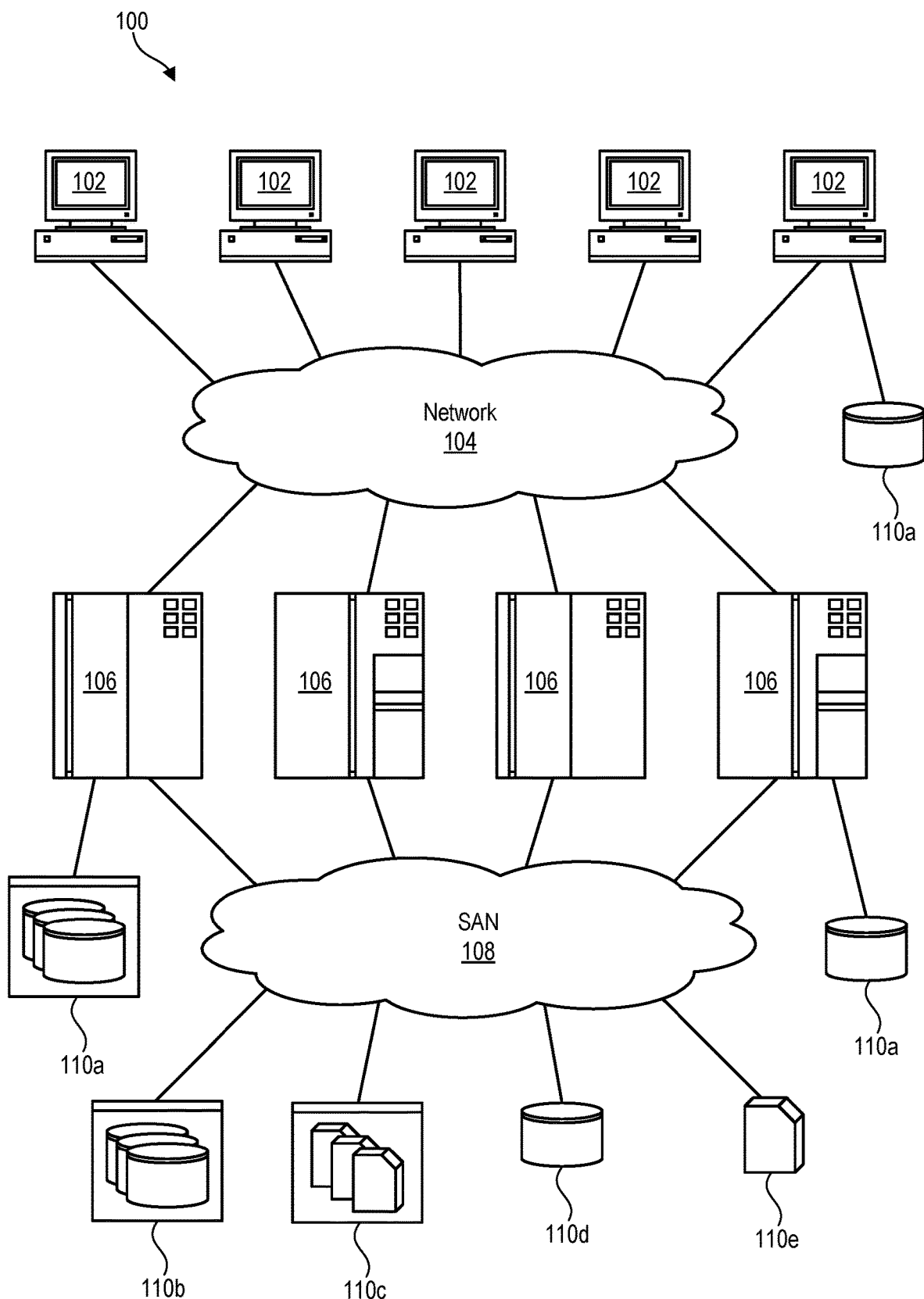
FIG. 1 is a high-level block diagram showing one example of a network environment in which systems and methods in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment where systems and methods in accordance with the invention may be implemented. The network environment 100 is presented by way of example and not limitation. Indeed, the systems and methods disclosed herein may be applicable to a wide variety of different network environments, in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, the client computers 102 initiate communication sessions, whereas the server computers 106 wait for requests from the client computers 102. In certain embodiments, the computers 102 and/or servers 106 may connect to one or more internal or external direct-attached storage systems 110*a* (e.g., arrays of hard-disk drives, solid-state drives, tape drives, etc.). These computers 102, 106 and direct-attached storage systems 110*a* may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems, such as arrays 110*b* of hard-disk drives or solid-state drives, tape libraries 110*c*, individual hard-disk drives 110*d* or solid-state drives 110*d*, tape drives 110*e*, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC).

Figure 2:
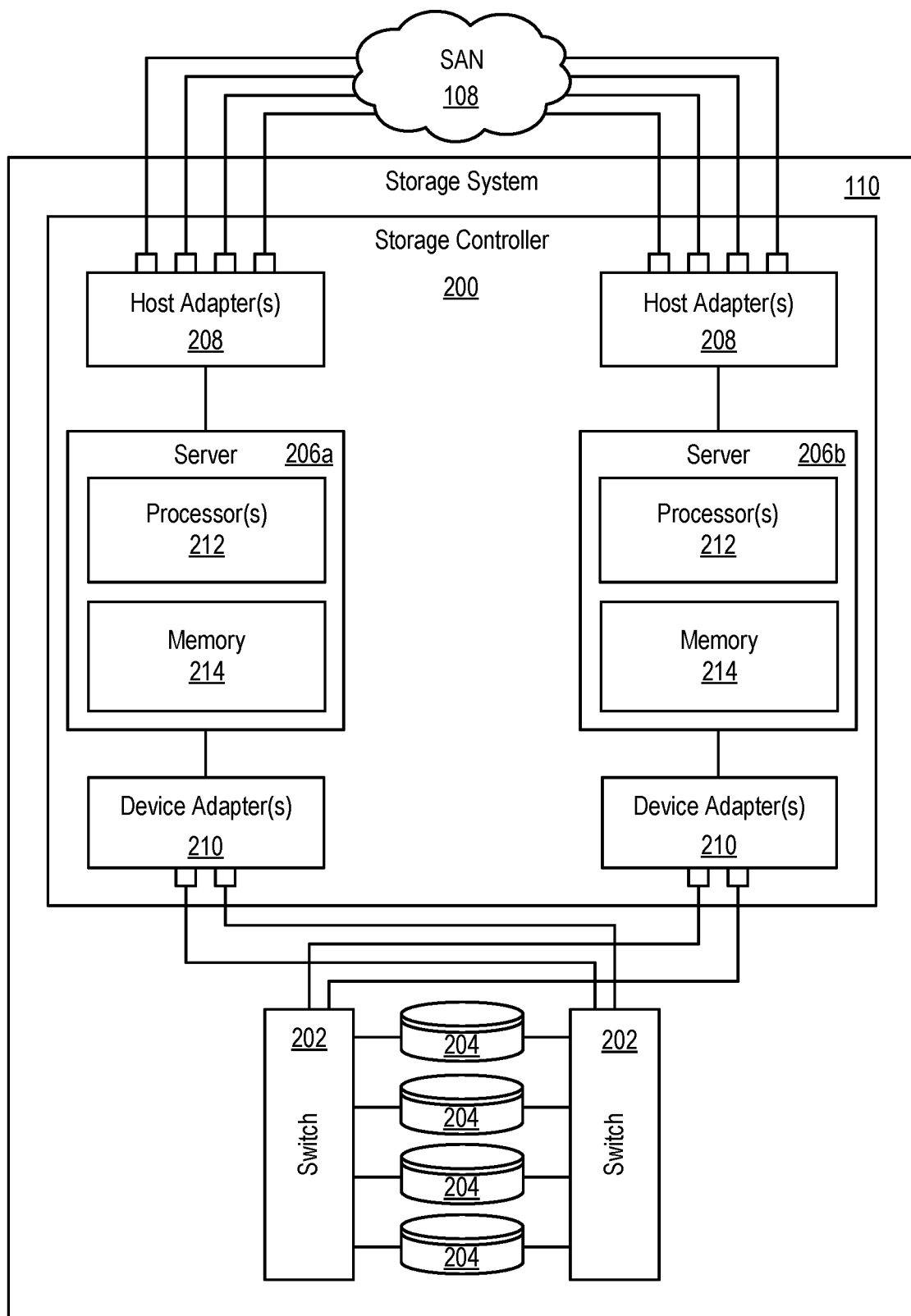
FIG. 2 is a high-level block diagram showing one example of a storage system in the network environment of FIG. 1.

Referring to FIG. 2, one embodiment of a storage system 110 containing an array of hard-disk drives 204 and/or solid-state drives 204 is illustrated. As shown, the storage system 110 includes a storage controller 200, one or more switches 202, and one or more storage drives 204, such as hard disk drives 204 or solid-state drives 204 (such as flash-memory-based drives 204). The storage controller 200 may enable one or more hosts 106 (e.g., open system and/or mainframe servers 106 running operating systems such z/OS, zVM, or the like) to access data in the one or more storage drives 204.

In selected embodiments, the storage controller 200 includes one or more servers 206. The storage controller 200 may also include host adapters 208 and device adapters 210 to connect the storage controller 200 to host devices 106 and storage drives 204, respectively. Multiple servers 206*a*, 206*b* may provide redundancy to ensure that data is always available to connected hosts 106. Thus, when one server 206*a* fails, the other server 206*b* may pick up the I/O load of the failed server 206*a* to ensure that I/O is able to continue between the hosts 106 and the storage drives 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. These software modules may manage all read and write requests to logical volumes in the storage drives 204.

One example of a storage system 110 having an architecture similar to that illustrated in FIG. 2 is the IBM DS8000™ enterprise storage system. The DS8000™ is a high-performance, high-capacity storage controller providing disk storage that is designed to support continuous operations. Nevertheless, the systems and methods disclosed herein are not limited to operation with the IBM DS8000™ enterprise storage system 110, but may operate with any comparable or analogous storage system 110, regardless of the manufacturer, product name, or components or component names associated with the system 110. Furthermore, any storage system that could benefit from one or more embodiments of the invention is deemed to fall within the scope of the invention. Thus, the IBM DS8000™ is presented by way of example and is not intended to be limiting.

Figure 3:
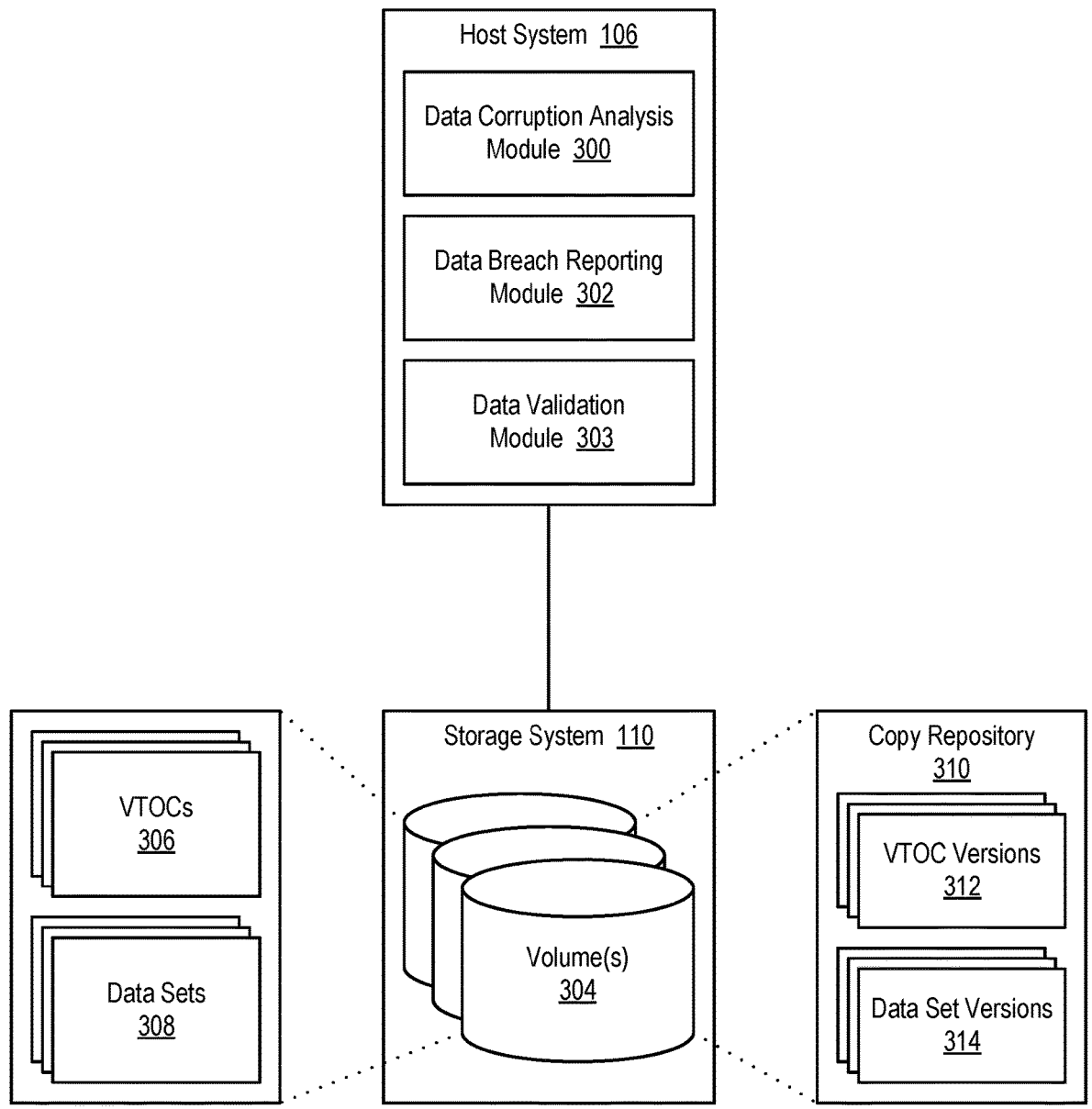
FIG. 3 is a high-level block diagram showing various modules for performing features and functions in accordance with the invention.

Referring to FIG. 3, in certain embodiments, a storage system 110 such as that illustrated in FIG. 2 may host various volumes 304 (e.g., logical volumes 304) to store data. In certain embodiments, this data may be stored in the form of data sets 308, such as Virtual Storage Access Method (VSAM) data sets 308. Each volume 304 may, in certain embodiments, include a volume table of contents 306 (VTOC) that provides a way of locating data sets 308 that reside on a particular volume 304. In certain embodiments, the volumes 304 may host a copy repository 310 that stores previous versions 312, 314 of the VTOCs 306 and data sets 308. One technique for storing these previous versions 312, 314 will be discussed in association with FIG. 4. In certain embodiments, new versions 312, 314 of the data sets 308 and VTOCs 306 may be stored in the copy repository 310 at specific time intervals, such as every thirty minutes, up to a certain number (e.g., five hundred) of versions 312, 314. In certain embodiments, the versions 312, 314 are stored in the form of incremental copies that only contain data that has changed since generation of the preceding versions 312, 314.

As previously mentioned, an organization often does not become aware that data has been corrupted until some time after the corruption has occurred. The organization will often have no idea when the corruption occurred, which makes it extremely difficult to identify the source of the corruption, as well as take steps to prevent the corruption from occurring again. In some cases, the organization may not know the state or condition of the data prior to the corruption. In yet other cases, an organization may discover that a data breach occurred but not know whether data was changed or corrupted during the breach, or know the exact timing or events associated with the breach.

Thus, systems and methods are needed to enable organizations to identify sources and timing of data corruption in order to recover the data and ideally prevent the corruption from happening again. Such systems and methods will ideally take advantage of data copy repositories that store periodic incremental snapshots of data. Further needed are systems and methods to determine changes to data, as well as timing associated with the changes, when a data breach occurs.

In order to provide the above-described features and benefits, in certain embodiments, a data corruption analysis module 300, data breach reporting module 302, and data validation module 303 may be provided. These modules 300, 302, 303 may be implemented in software, hardware, firmware, or a combination thereof. The data corruption analysis module 300 may be configured analyze the source and timing of data corruption, whereas the data breach reporting module 302 may be configured to determine data changes and timing associated with a data breach. The data validation module 303 may be configured to validate versions 314 of a data set 308 residing in the copy repository 310. Various methods or techniques that may be executed by the data corruption analysis module 300 will be discussed in association with FIGS. 5 through 8. Similarly, various methods or techniques that may be executed by the data breach reporting module 302 will be discussed in association with FIGS. 9 and 10. Methods or techniques that may be executed by the data validation module 303 will be discussed in association with FIGS. 11 and 12. The data corruption analysis module 300, data breach reporting module 302, and data validation module 303 are shown in a host system 106 although the modules 300, 302, 303 are not necessarily limited to implementation within a host system 106.

Figure 4:
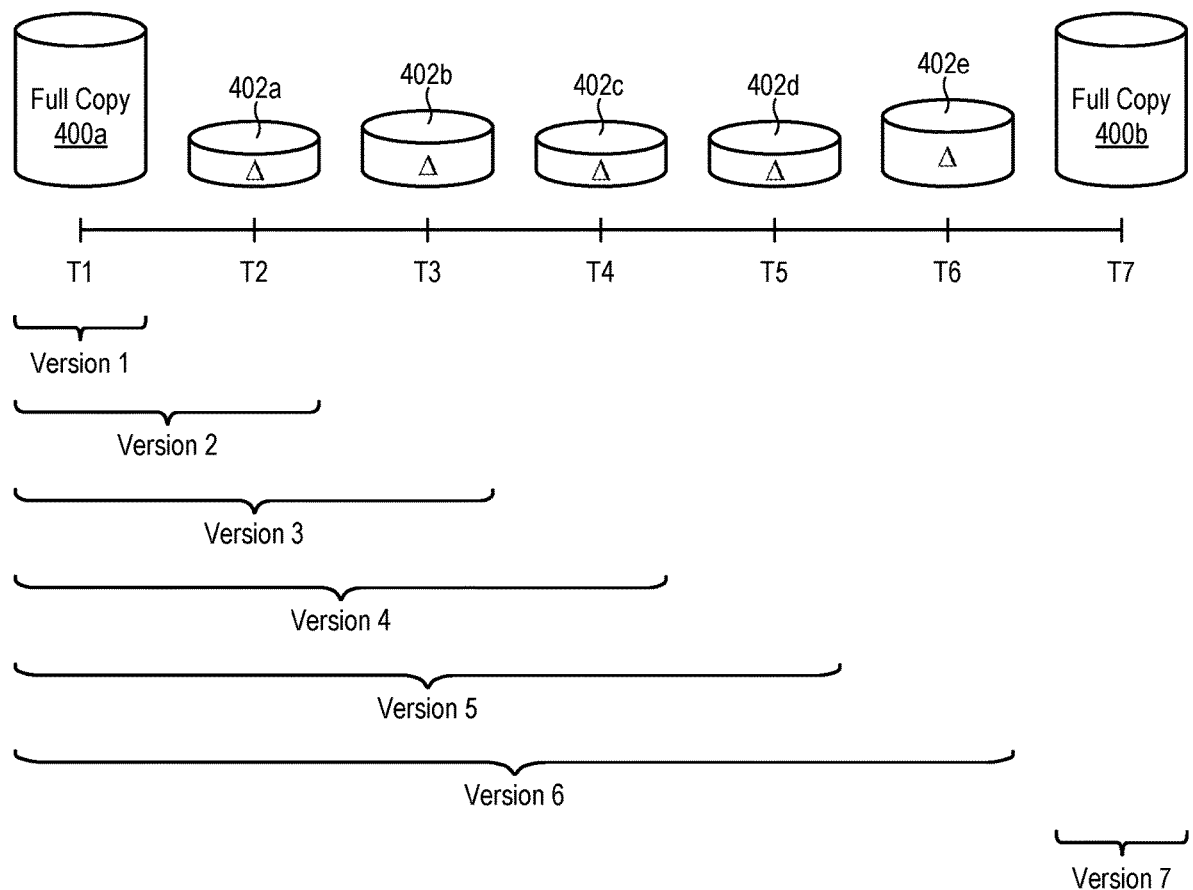
FIG. 4 is a high-level block diagram showing data versions within a copy repository.

Referring to FIG. 4, as previously mentioned, versions 312, 314 of data sets 308 and VTOCs 306 archived in the copy repository 310 may be stored in the form of incremental copies that only contain data that has changed since the time of recording the preceding versions 312, 314. One example of such an incremental storage technique is illustrated in FIG. 4. As shown in FIG. 4, a full copy 400a of a VTOC 306 or data set 308 may be initially stored in the copy repository 310. This full copy 400a is referred to as "Version 1" in the illustrated example. After the full copy 400a is recorded, each successive version may be stored in the form of an incremental copy 402 that contains data that has changed since the full copy 400 or the previous incremental copy 402 was recorded. Thus, in the illustrated example, the full copy 400 along with the incremental copy 402a may form "Version 2," the full copy 400a and incremental copies 402a, 402b may form "Version 3," and so forth. In this way, versions 312, 314 of VTOCs 306 and data sets 308 may be stored at selected intervals (e.g., every thirty minutes) without having to store a full copy of the VTOCs 306 and data sets 308 at each interval. At some point, a full copy 400b may be recorded again in the copy repository 310. In the illustrated example, the second full copy 400b makes up "Version 7."

Figure 5:
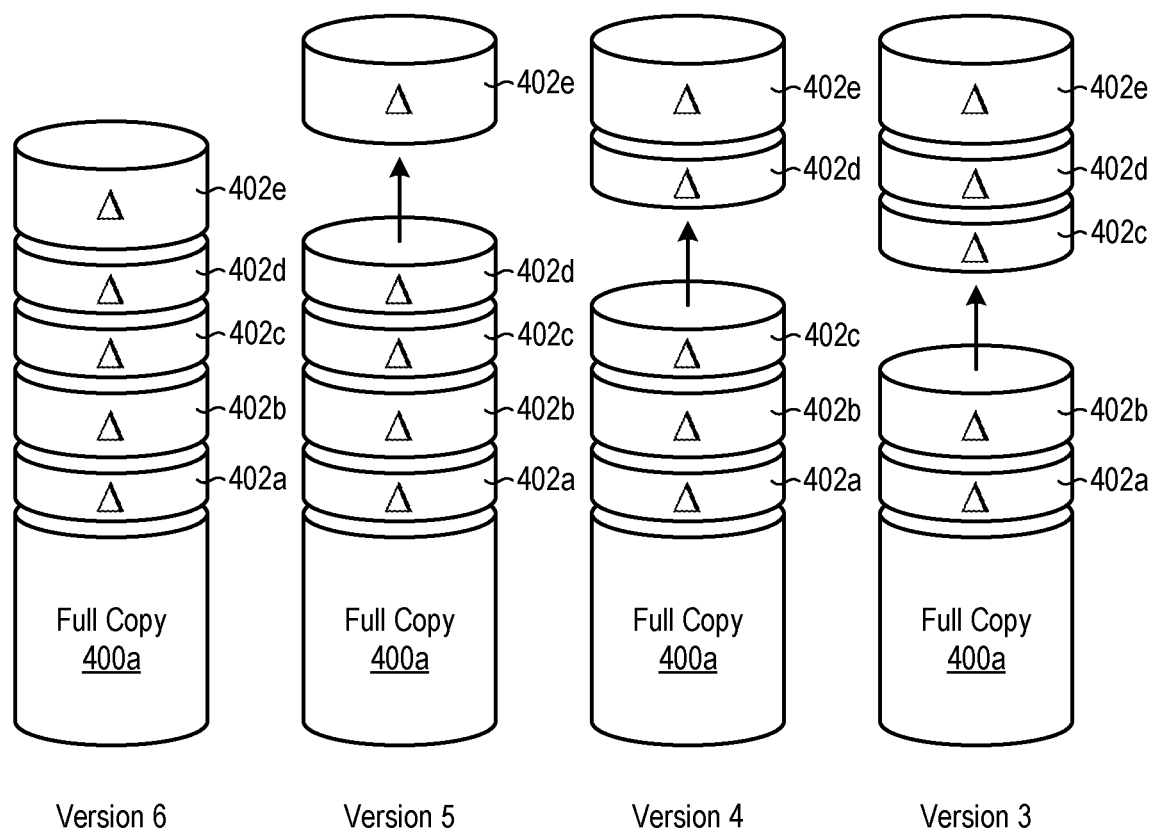
FIG. 5 is a high-level block diagram showing a first technique for identifying data corruption in a data set.

Referring to FIG. 5, in certain embodiments in accordance with the invention, an organization may discover that data (e.g., a VTOC 306 and/or data set 308) has been corrupted and would like to know the source and timing of the corruption. Ideally, this will enable corrective actions to be taken and/or prevent the data corruption from occurring again. Assuming the organization is using a copy repository 310 that stores data in the manner described in FIG. 4, the data corruption analysis module 300 previously discussed may be used to ascertain the source and timing of the corruption. In certain embodiments, the data corruption analysis module 300 may use the method 600 of FIG. 6 to ascertain the source and timing of the data corruption.

Figure 6:
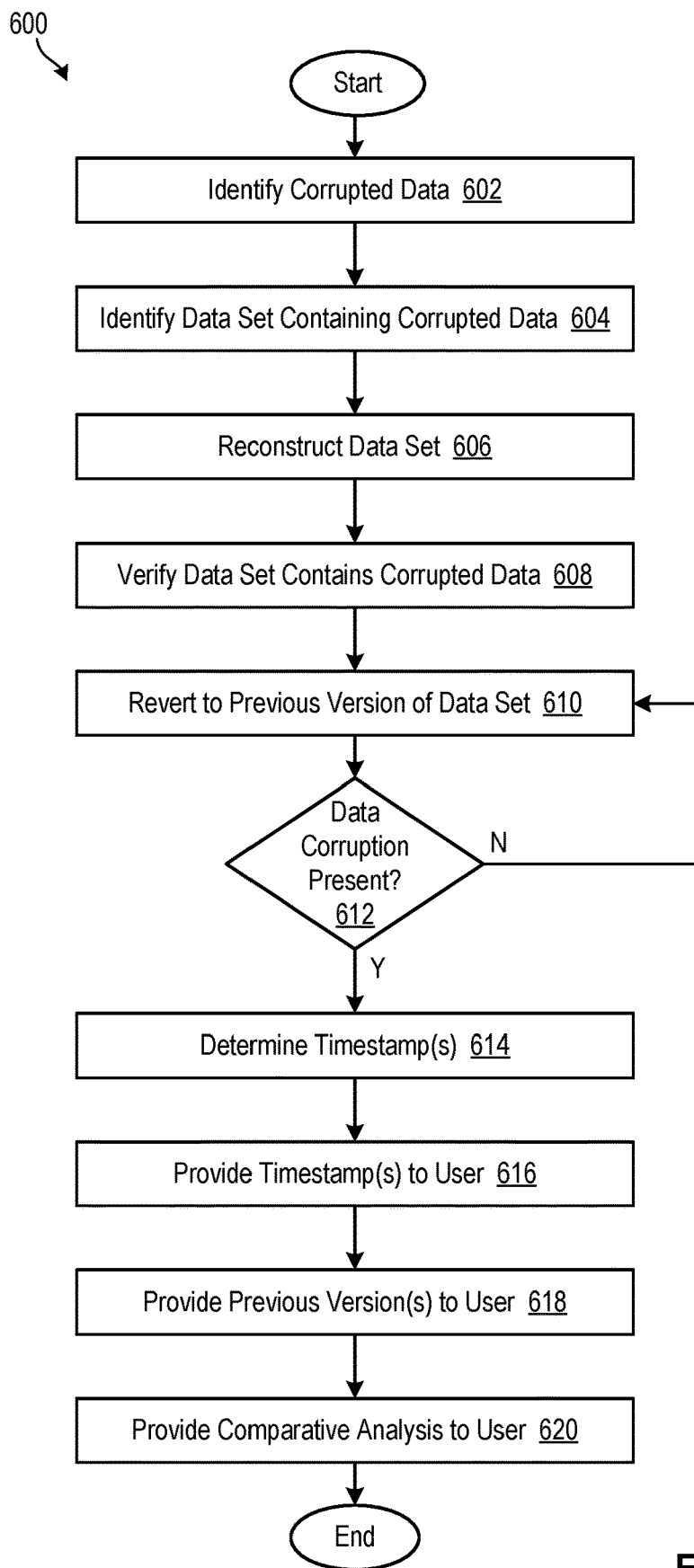
FIG. 6 is a flow diagram showing one embodiment of a method for analyzing data corruption in a data set using the technique of FIG. 5.

Referring to FIG. 6, while continuing to refer generally to FIG. 5, as shown in FIG. 6, the data corruption analysis module 300 may receive 602 as input the data that was corrupted. In certain embodiments, this may be a string of data. The data corruption analysis module 300 may also receive 604 as input the name of the data set 308 in which the data corruption was detected along with the volume 304 or volumes 304 in which the data set 308 resides. The data corruption analysis module 300 may then reconstruct 606 the data set using the VTOC 306 and data set 308 information in the copy repository 310. For example, referring again to FIG. 5, assuming the data corruption analysis module 300 needs to reconstruct Version 6 of the data set 308, the data corruption analysis module 300 may reconstruct the data set 308 using the full copy 400a and each of the incremental copies 402a-e stored in the copy repository 310.

Once the data set 308 is reconstructed 606, the data corruption analysis module 300 may verify 608 that the data set 308 actually contains the corrupted data received at step 602. This may be performed by reading through the blocks of the data set 308 to confirm that the corrupted data is contained within the data set 308. In certain embodiments, this may accomplished by doing a sequential read of the data set 308 until the corrupted data is encountered. If the data set 308 is an indexed data set 308 and the key for the corrupted record is still valid, then a direct read of the corrupted record may be performed.

Assuming the corrupted data is found in the reconstructed data set 308, the data corruption analysis module 300 reverts 610 to the immediately preceding version of the data set 308 (in certain embodiments, reverting to a previous version of the data set 308 also includes reverting to a previous version of a VTOC 306 that is used to reference the data set 308). This may be accomplished, for example, by removing the most recent incremental update 402 from the data set 308 (thereby reverting the data set 308 to Version 5 in the illustrated example), as shown in FIG. 5. At this point, the data corruption analysis module 300 may determine 612 whether the data corruption is still present in the data set 308. This may be accomplished by reading through the data set 308 in the manner previously described until the corrupted data is found within the data set 308. Because data may move around within a data set 308, the data set 308 may need to be searched for the corrupted data. For example, VSAM data sets 308 may undergo control interval (CI) and control area (CA) splits that cause data to be moved around within a data set 308. For this reason, the data set 308 may need to be searched for the corrupted data since the data's location within the data set 308 may change from version to version.

If, at step 612, the corrupted data is found in the data set 308, the data corruption analysis module 300 may once again revert to a previous version of the data set 308 by removing the next incremental update 402d from the data set 308 (thereby reverting to Version 4 as shown in FIG. 5). The data set 308 may then be searched again for the corrupted data. These steps 610, 612 may be performed until a version of the data set 308 is reached that does not contain the corrupted data. Assume, for the sake of example, that this version is Version 3 as shown in FIG. 5.

Once a version of the data set 308 and VTOC 306 is found that no longer contains the corrupted data, the data corruption analysis module 300 may determine 614 a timestamp associated with the versions 312, 314 of the data set 308 and VTOC 306 that no longer contain the corrupted data and/or a timestamp associated with the earliest versions 312, 314 of the data set 308 and VTOC 306 that contain the corrupted data. These timestamp(s) may be provided to a user so that the user can ascertain a time window (e.g., a thirty minute window) when the data was corrupted. In certain embodiments, the data corruption analysis module 300 may also provide 618 the actual versions 312, 314 of the data set 308 and VTOC 306 to the user that correspond to the timestamp(s). Furthermore, in certain embodiments, the data corruption analysis module 300 may provide 620 a comparative analysis that shows the data of interest both before and after the corruption.

The timestamps determined at step 614 may enable a user to isolate the timeframe when the corruption occurred. This, in turn, may enable a user to focus in and analyze information stored in System Management Facility (SMF) records and system logs to determine activity that occurred during the window when the data was corrupted. This may help to determine the cause of the corruption. A user may also take the data set 308 at the time before the corruption, and then perform forward recovery steps by applying updates after that timestamp to recover the data set 308.

Figure 7:
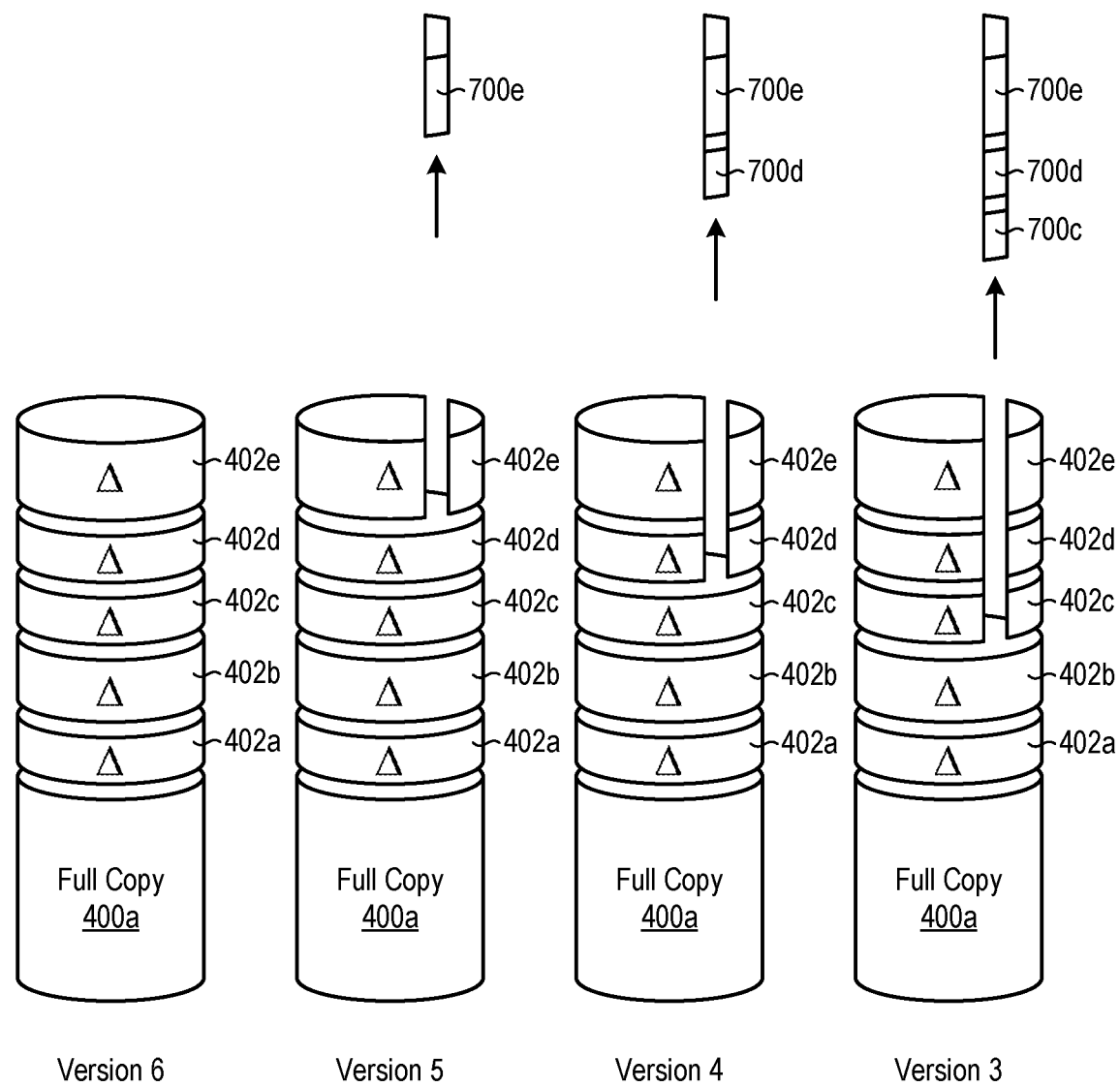
FIG. 7 is a high-level block diagram showing a second more optimized technique for identifying data corruption in certain types of data sets.

Referring to FIG. 7, in certain cases, such as with sequential data sets 308 or physical sequential non-VSAM data sets 308, the location of data corruption within a data set 308 may not change over time. In such cases, a more optimized method for analyzing data corruption may be used. More specifically, once data corruption is identified within a data set 308 and the specific location (e.g. storage element or range of storage elements) of the data corruption within the data set 308 is determined, only updates to the specific location may be rolled back to determine when the data corruption occurred. This contrasts with the method 600 of FIG. 6, which rolls back incremental updates 402 to the entire data set 308 in order to determine when the data corruption occurred.

Figure 8:
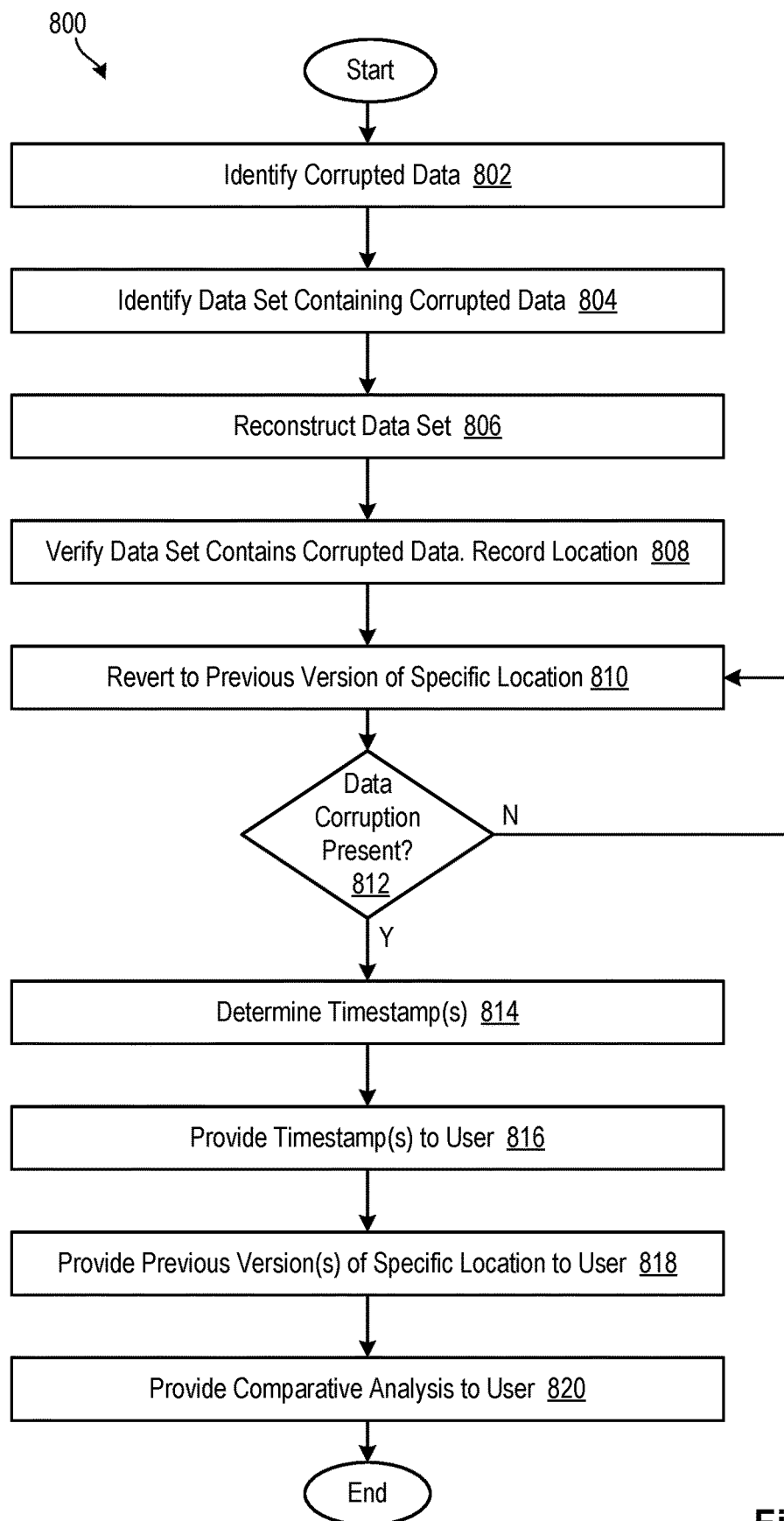
FIG. 8 is a flow diagram showing one embodiment of a method for analyzing data corruption in a data set using the technique of FIG. 7.

Referring to FIG. 8, while continuing to refer generally to FIG. 7, using the optimized method 800 of FIG. 8, the data corruption analysis module 300 may receive 802 as input the data (e.g., string of data) that was corrupted. The data corruption analysis module 300 may also receive 804 as input the name of the data set 308 in which the data corruption was detected along with the volume 304 or volumes 304 in which the data set 308 resides. The data corruption analysis module 300 may then reconstruct 806 the data set 308 using the VTOC 306 and data set 308 information in the copy repository 310. For example, referring to FIG. 7, assuming the data corruption analysis module 300 needs to reconstruct Version 6 of the data set 308, the data corruption analysis module 300 may reconstruct the data set 308 using the full copy 400*a* and each of the incremental copies 402*a-e* stored in the copy repository 310.

Once the data set 308 is reconstructed 806, the data corruption analysis module 300 may verify 808 that the data set 308 actually contains the corrupted data received at step 802. This may be accomplished by sequentially reading through the blocks of the data set 308 to confirm that the corrupted data is contained within the data set 308. Once the corrupted data is encountered within the data set 308, the location of the corrupted data within the data set 308 is recorded 808. As previously mentioned, because the method 800 deals with a sequentially-written data set 308 or other type of data set 308 where data within the data set 308 does not move over time, the location of the data corruption will stay the same for all versions of the data set 308 in which the data corruption is present.

Upon verifying 808 that the corrupted data is found in the reconstructed data set 308, the data corruption analysis module 300 reverts 810 to the immediately preceding version of the specific location (in certain embodiments, reverting to a previous version of the specific location also includes reverting to a previous version of the VTOC 306 that is used to reference the specific location). This may be accomplished, for example, by removing the most recent incremental update 700*e* for only that specific location (thereby reverting the specific location to Version 5), as shown in FIG. 5. At this point, the data corruption analysis module 300 may determine 812 whether the data corruption is still present in the specific location.

If, at step 812, the corrupted data is found in the specific location, the data corruption analysis module 300 may once again revert to a previous version of the specific location by removing an incremental update 700*d* to the specific location (thereby reverting to Version 4 of the specific location as shown in FIG. 5). The specific location may then be searched again for the corrupted data. These steps 810, 812 may be performed until a version of the specific location is found that does not contain the corrupted data. Assume, for the sake of example, that this version is Version 3 as shown in FIG. 7.

Once a version of the specific location and VTOC 306 is found that no longer contains the corrupted data, the data corruption analysis module 300 may determine 814 a timestamp associated with the versions 312, 314 of the specific location and VTOC 306 that no longer contain the corrupted data and/or a timestamp associated with the earliest versions 312, 314 of the specific location and VTOC 306 that contain the corrupted data. These timestamp(s) may be provided to a user so that the user can ascertain a time window (e.g., a thirty minute window) when the data in the specific location was corrupted. In certain embodiments, the data corruption analysis module 300 may also provide 818 the actual versions 312, 314 of the specific location and VTOC 306 that correspond to the timestamp(s). Furthermore, in certain embodiments, the data corruption analysis module 300 may provide 820 a comparative analysis that shows the data in the specific location both before and after the corruption.

The timestamps provided at step 816 may enable a user to isolate the timeframe when the data in the specific location was corrupted. This, in turn, may enable a user to analyze information stored in SMF records and system logs to determine activity that occurred during the timeframe. A user may also take the specific location at the time before corruption, and then perform forward recovery steps by applying updates after that timestamp to recover the data in the specific location.

Figure 9:
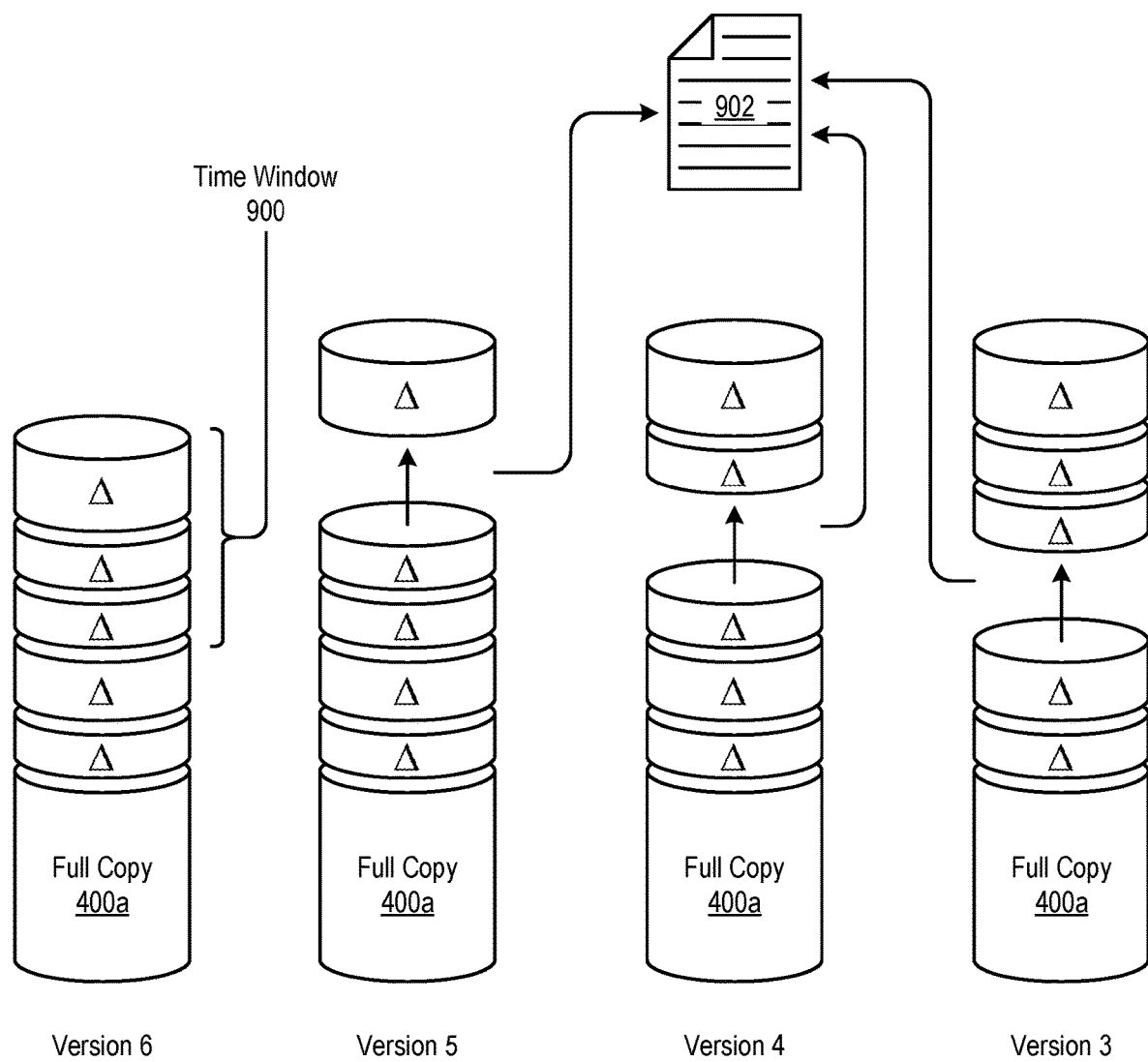
FIG. 9 is a high-level block diagram showing a technique for generating a report that documents changes to a data set or volume in association with a data breach.

Referring to FIG. 9, as previously mentioned, in certain cases, an organization may discover that a data breach occurred but not know whether data was changed or corrupted during the breach, or know the exact timing or events associated with the breach. A data breach reporting module 302 in accordance with the invention may be used to ascertain this information. One example of a method 1000 that may be performed by the data breach reporting module 302 is illustrated in FIG. 10.

Figure 10:
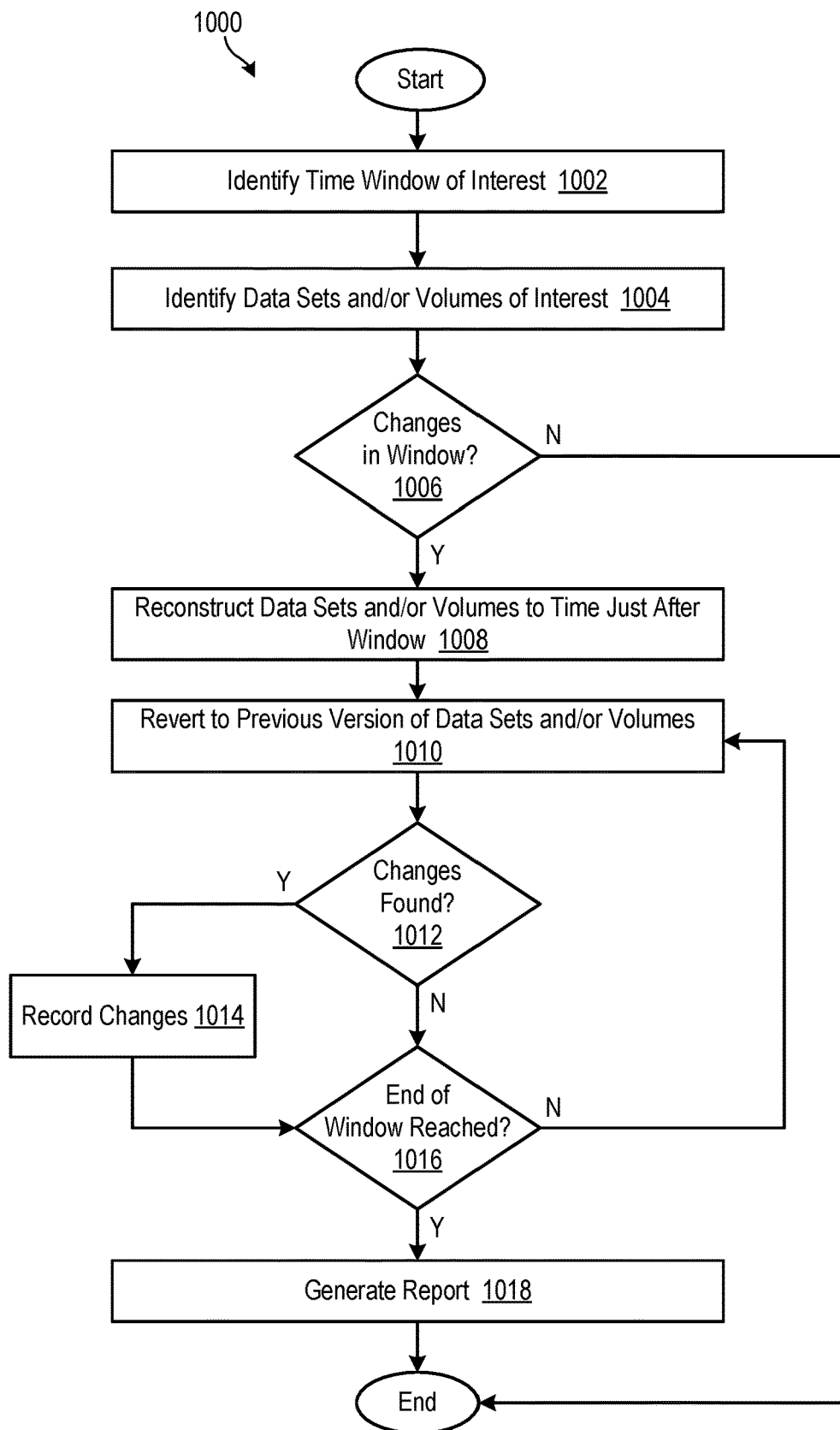
FIG. 10 is a flow diagram showing one embodiment of a method for documenting changes using the technique of FIG. 9.

Referring to FIG. 10, while continuing to refer generally to FIG. 9, in certain embodiments, the data breach reporting module 302 may initially identify 1002 a time window 900 in which a data breach potentially occurred. The data breach reporting module 302 may further identify 1004 data sets 308 and/or volumes 304 in which the data breach potentially occurred. In certain embodiments, the data breach reporting module 302 may receive this information from a user.

The data breach reporting module 302 may then determine 1006 whether any changes occurred to the data sets 308 and/or volumes 304 during the time window 900 of interest. If so, the data breach reporting module 302 reconstructs 1008 the data sets 308 and/or volumes 304 to a time just after the time window 900. The data breach reporting module 302 then reverts 1010 to a previous version of the data sets 308 and/or volumes 304 by rolling back an incremental update to the data sets 308 and/or volumes 304 (which includes rolling back the VTOC 306 for the data sets 308 and/or volumes 304), as shown in FIG. 9. The data breach reporting module 302 then determines 1012 whether any changes occurred to the data sets 308 and/or volumes 304 when the incremental update is rolled back. If so, the data breach reporting module 302 records 1014 the changes. This may include recording 1014 data elements (e.g., tracks) that had their data change, the location of the data elements, and/or the name of the data set 308 in which the changes occurred. Information in the VTOC 306 that is also rolled back may be used to determine the name of the data set 308 that had its data change.

The data breach reporting module 302 then determines 1016 whether the end of the time window 900 has been reached (i.e., the data sets 308 and/or volumes 304 have been rolled back to the end of the time window 900 or to a time preceding the time window 900). If the end of the time window 900 has not been reached, the data breach reporting module 302 reverts 1010 to a previous version of the data sets 308 and/or volumes 304 and repeats steps 1012, 1014, 1016 until the end of the time window 900 is reached. When the end of the time window 900 is reached, the data breach reporting module 302 generates 1018 a report 902 that documents all changes that occurred to the data sets 308 and/or volumes 304 during the time window 900.

If a user wants to reduce the scope of the data breach analysis to only specific data sets 308, data in the VTOC 306 for the volume 304 containing the data sets 308 may be used to limit the analysis to only those data elements (e.g., tracks) for the data sets in question. Only those data elements will be rolled back and compared along with the VTOC 306 to keep the VTOC 306 current with the data being rolled back.

The report 902 documenting the changed data may be provided to a user. If the user has recovery logs of legitimate non-breach activity occurring during the time window 900, the data updates documented in the report 902 may be searched for in forward recovery logs. Since the report 902 only documents snapshots in time of data held in the data sets 308 and/or volumes 304, it is possible that multiple updates occurred to the data sets 308 and/or volumes 304 during the time window 900. In other words, every update in the log may not be present in the copy repository 310 since the data sets 308 and/or volumes 304 may have been updated several times between snapshots. However every change documented in the report 902 should be present in the recovery log. By comparing data in the report 902 against the recovery log, it may help to confirm that an update to a data set 308 and/or volume 304 of interest during the time window 900 was legitimate. If changes occurred that were not recorded in the recovery log, these changes may be illegitimate or indicate unauthorized activity.

Although particular reference has been made herein to "reverting" to previous versions 312, 314 of data sets 308 and/or VTOCs 306, in other embodiments, systems and methods in accordance with the invention may start with old versions of data sets 308 and/or VTOCs 306 and then work forward by applying incremental updates to these older versions. After each incremental update is applied, systems and methods in accordance with the invention may check whether corrupted data is found in the data sets 308. Thus, systems and methods in accordance with the invention may, in certain embodiments, work forward as opposed to backward as described in FIGS. 5 through 8. This technique may also be used to determine what changes occurred to a data sets 308 or volume 304 during a particular time window 900, which may be helpful when analyzing a data breach.

Figure 11:
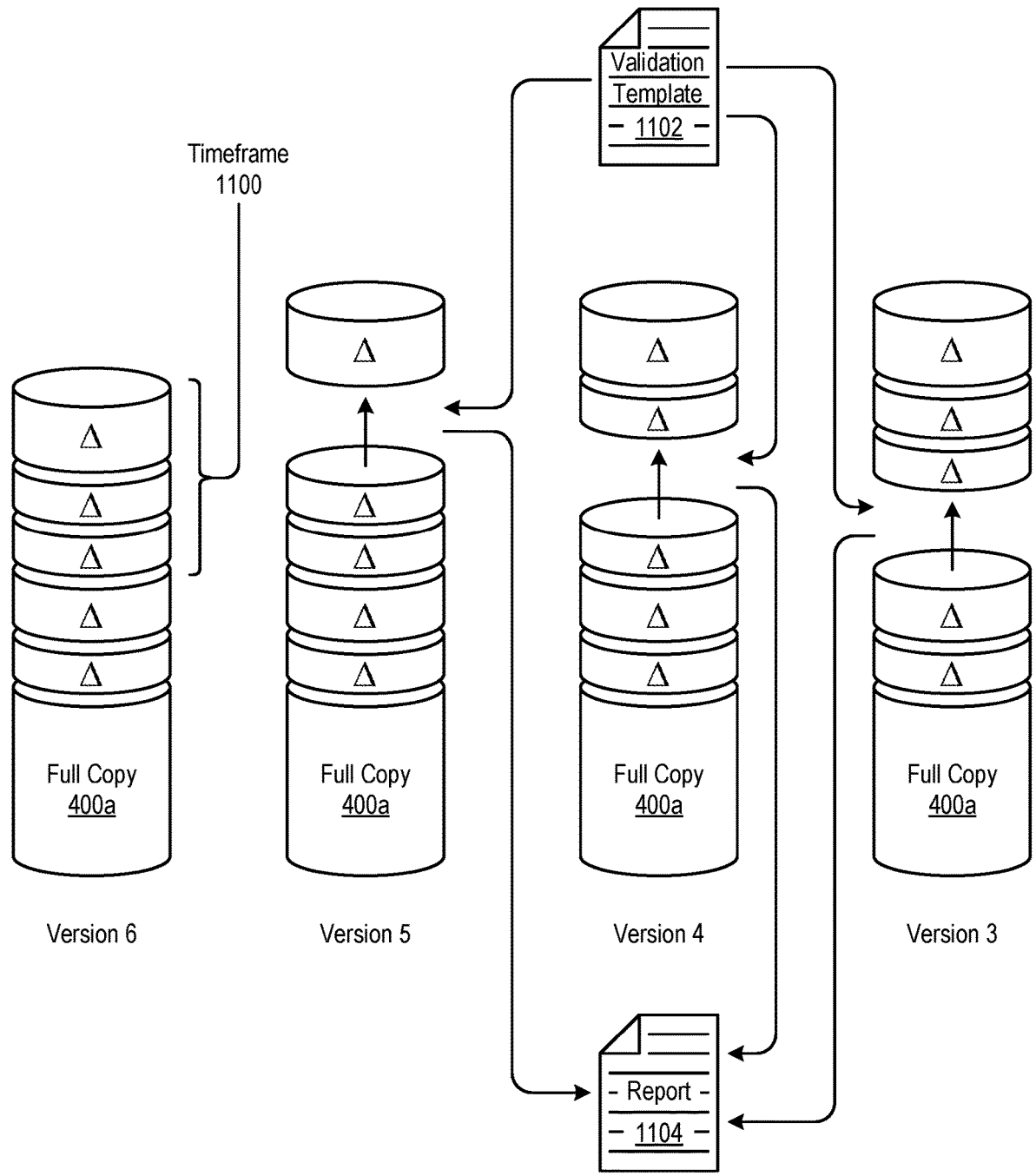
FIG. 11 is a high-level block diagram showing a technique for validating data in a copy repository using a template.

Referring to FIG. 11, in certain cases, an organization may use a copy repository 310 such as that described in FIGS. 3 and 4 and may wish to periodically validate data in the copy repository 310. This may occur in response to discovering data corruption or a data breach. Alternatively, the organization may simply wish to conduct periodic reviews of its data to verify its integrity. A data validation module 303 in accordance with the invention may be used to perform these validation functions. One example of a method 1200 that may be executed by the data validation module 303 will be discussed in association with FIG. 12.

As shown in FIG. 11, in certain embodiments, a data validation module 303 in accordance with the invention may enable a user to establish a template 1102 that designates valid fields within a data set 308, as well as valid values (e.g., single values, ranges of values, etc.) and valid types of data within the fields. For example, some fields should only store numeric values, alphanumeric characters, ranges of values such as times or dates, or the like. In certain cases, certain data (e.g., timestamps, dates, etc.) within the fields should be ascending or descending from one version 314 of the data set 308 to the next. The template 1102 may document this type of information in order to validate a data set 308.

The data validation module 303 may further enable a user to designate a timeframe 1100 over which to validate versions 314 of the data set 308 residing in the copy repository 310. Starting at a first end of the timeframe 1100 and proceeding to a second end thereof, the data validation module 303 may attempt to validate each version 314 of the data set 308 within the timeframe 1100. In certain embodiments, the data validation module 303 may accomplish this by configuring a computing system (such as a host system 106) to a state that existed when the version 314 of the data set 308 was created in the copy repository 310. This may include restoring an operating system and catalogs, such as a volume table of contents (VTOC) 312 and/or VSAM volume data set (VVDS), to the same point-in-time as the version 314 of the data set 308 being validated.

Once the computing system is properly configured, the data validation module 303 may open the version 314 of the data set 308 on the computing system using standard access methods. Records in the version 314 of the data set 308 may then be read and validated against the template 1102. The template 1102 may include offset values to check within the data set 308, and types and/or ranges of values that are acceptable in fields of the data set 308. In certain embodiments, additional logic may be used to check whether key or time values within the data set 308 ascend or descend in an expected manner between versions 314 of the data set 308. For example, time or date values within the data set 308 may be expected to ascend from one version 314 of a data set 308 to the next. If this is not the case, this may indicate some type of problem or corruption within versions 314 of the data set 308.

If a version 314 of the data set 308 does not pass the validation, this may indicate that corruption is present in the version 314. If such is the case, the data validation module 303 may perform additional processing to determine when the corruption occurred. For example, the data validation module 303 may revert to previous versions 314 of the data set 308 by removing incremental updates 402 from the data set 308, as shown in FIG. 11. Each previous version 314 may be opened on the computing system in the state it was in when the version 314 was created. These previous versions 314 may then be checked in sequence until an uncorrupted version 314 of the data set 308 is found. This may help to isolate the timeframe when the corruption occurred, which may assist an administrator in determining a root cause of the corruption.

As versions 314 of the data set 308 are validated (or found to contain problems or inconsistencies), the data validation module 303 may document results of the validation. In certain embodiments, the data validation module 303 may generate a report 1104 that documents the results. The report 1104 may be provided to an administrator for use in tracking down corruption or other problems in a data set 308, or to verify the integrity of the data set 308 and previous versions 314 thereof.

Figure 12:
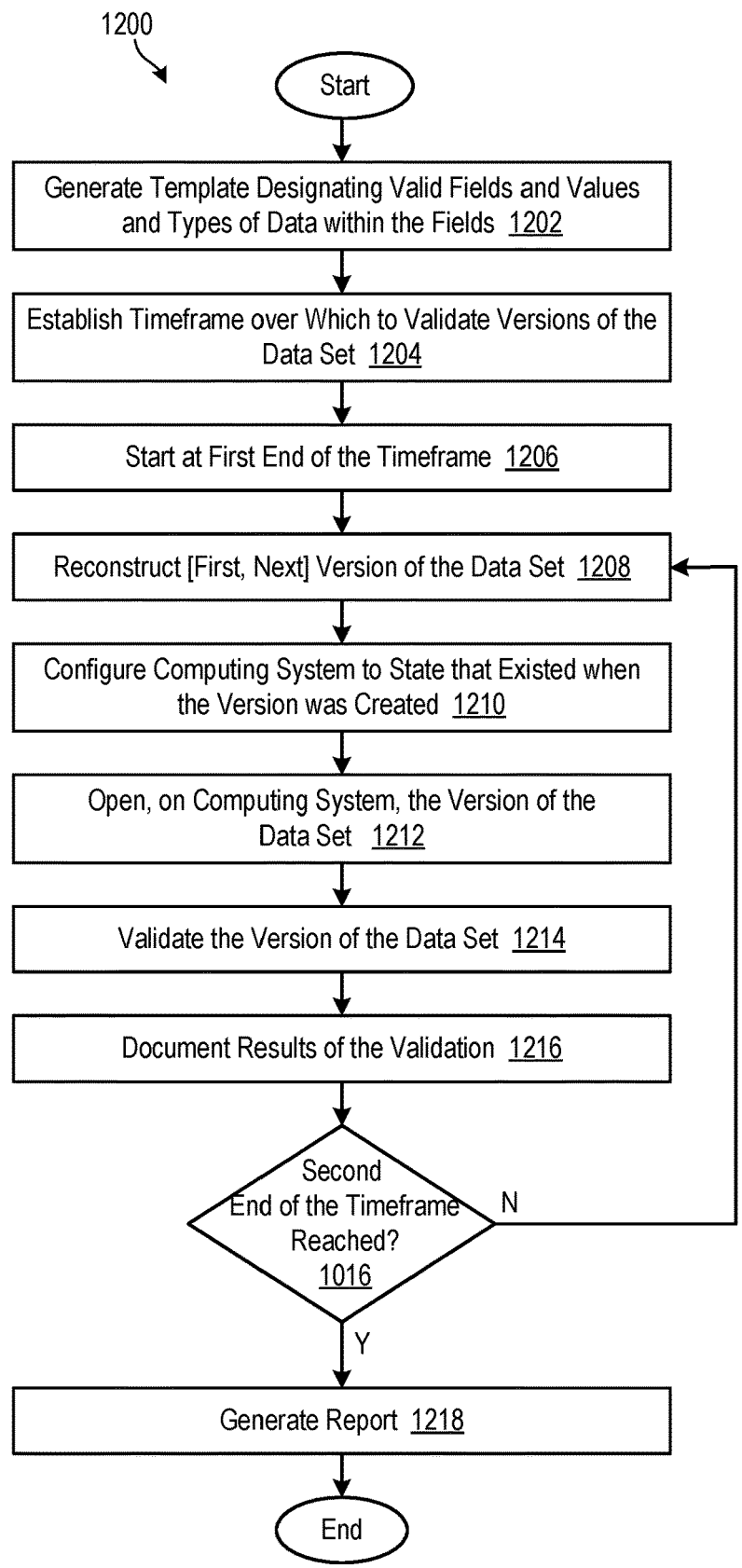
FIG. 12 is a flow diagram showing one embodiment of a method for validating data using the technique of FIG. 11.

Referring to FIG. 12, one embodiment of a method 1200 for validating data in a copy repository 310 is illustrated. This method 1200 may, in certain embodiments, be executed by the data validation module 303 previously described. As shown, the method 1200 initially generates 1202 a template 1102 that designates valid fields for a data set 308, and valid values and types of data within the fields. The method 1200 also establishes 1204 a timeframe 1100 over which to validate versions 314 of the data set 308. The method 1200 starts 1206 its analysis at a first end of the timeframe 1100. This may include starting from a recent version 314 of the data set 308 and working backward in time, or from an older version 314 of the data set 308 and working forward in time.

Once the timeframe 1100 is established, the method 1200 reconstucts 1208 a first version 314 of the data set 308 at or near the beginning of the timeframe 1100. The method 1200 also configures 1210 a computing system to a state that existed at the time the version 314 was created. This may include restoring an operating system and/or catalogs to a state that existed at or near the time the version 314 was created. The method 1200 then opens, on the computing system, the version 314 of the data set 308 reconstructed at step 1208. The reconstructed catalogs/indexes (e.g., VTOC and/or VVDS) may assist in finding records or fields within the data set 308.

The version 314 may then be validated 1214 against the template 1102 generated at step 1202. The results of the validation may be documented 1216. At this point, the method 1200 may determine 1016 whether the second end of the timeframe 1100 has been reached. If not, the method 1200 reconstructs 1208 the next consecutive version 314 of the data set 308 (such as by adding or removing the most recent incremental update 402, depending on whether the analysis is proceeding forward or backward in time) and repeats the method steps 1208, 1210, 1212, 1214, 1216 for the next version 314. Once all versions 314 in the timeframe 1100 have been analyzed and validated, the method 1200 may generate 1218 a report 1104 that documents the results of the validation process.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for validating data in a copy repository, the method comprising:
   establishing a template that designates valid fields within a data set, as well as valid values and types of data within the fields;
   establishing a timeframe over which to validate versions of the data set residing in a copy repository;
   starting at a first end of the timeframe, repeating the following for specific points-in-time within the timeframe until a second end of the timeframe is reached:
   configuring a computing system to a state that existed at a specific point-in-time within the timeframe, wherein configuring the computing system to the state that existed at the specific point-in-time comprises restoring at least one of a volume table of contents (VTOC) and VSAM volume data set (VVDS) to a state that existed at the specific point-in-time;
   opening, on the computing system, a version of the data set associated with the point-in-time; and
   validating the version against the template.

2. The method of claim 1, wherein configuring the computing system to the state that existed at the specific point-in-time comprises restoring an operating system of the computing system to a state that existed at the specific point-in-time.

3. The method of claim 1, further comprising documenting results of the validation.

4. The method of claim 3, wherein documenting the results of the validation comprises documenting any failure of the validation.

5. The method of claim 1, wherein validating comprises verifying whether values in the fields are one of ascending and descending between versions.

6. The method of claim 1, wherein the second end corresponds to a point-in-time when corruption is detected in the data set.

7. The method of claim 1, wherein opening comprises opening using standard access methods associated with the data set.

8. A computer program product for validating data in a copy repository, the computer program product comprising a non-transitory computer-readable storage medium having computer-usable program code embodied therein, the computer-usable program code configured to perform the following when executed by at least one processor:
   establish a template that designates valid fields within a data set, as well as valid values and types of data within the fields;
   establish a timeframe over which to validate versions of the data set residing in a copy repository;
   starting at a first end of the timeframe, repeat the following for specific points-in-time within the timeframe until a second end of the timeframe is reached:
   configure a computing system to a state that existed at a specific point-in-time within the timeframe, wherein configuring the computing system to the state that existed at the specific point-in-time comprises restoring at least one of a volume table of contents (VTOC) and VSAM volume data set (VVDS) to a state that existed at the specific point-in-time;
   open, on the computing system, a version of the data set associated with the point-in-time; and
   validate the version against the template.

9. The computer program product of claim 8, wherein configuring the computing system to the state that existed at the specific point-in-time comprises restoring an operating system of the computing system to a state that existed at the specific point-in-time.

10. The computer program product of claim 8, wherein the computer-usable program code is further configured to document results of the validation.

11. The computer program product of claim 10, wherein documenting the results of the validation comprises documenting any failure of the validation.

12. The computer program product of claim 8, wherein validating comprises verifying whether values in the fields are one of ascending and descending between versions.

13. The computer program product of claim 8, wherein the second end corresponds to a point-in-time when corruption is detected in the data set.

14. The computer program product of claim 8, wherein opening comprises opening using standard access methods associated with the data set.

15. A system for validating data in a copy repository, the system comprising:
- at least one processor;
- at least one memory device operably coupled to the at least one processor and storing instructions for execution on the at least one processor, the instructions causing the at least one processor to:
  - establish a template that designates valid fields within a data set, as well as valid values and types of data within the fields;
  - establish a timeframe over which to validate versions of the data set residing in a copy repository;
  - starting at a first end of the timeframe, repeat the following for specific points-in-time within the timeframe until a second end of the timeframe is reached:
    - configure a computing system to a state that existed at a specific point-in-time within the timeframe, wherein configuring the computing system to the state that existed at the specific point-in-time comprises restoring at least one of a volume table of contents (VTOC) and VSAM volume data set (VVDS) to a state that existed at the specific point-in-time;
    - open, on the computing system, a version of the data set associated with the point-in-time; and
    - validate the version against the template.

16. The system of claim 15, wherein configuring the computing system to the state that existed at the specific point-in-time comprises restoring an operating system of the computing system to a state that existed at the specific point-in-time.

17. The system of claim 15, wherein the instructions further cause the at least one processor to document results of the validation.

18. The system of claim 17, wherein documenting the results of the validation comprises documenting any failure of the validation.

19. The system of claim 15, wherein validating comprises verifying whether values in the fields are one of ascending and descending between versions.

20. The system of claim 15, wherein the second end corresponds to a point-in-time when corruption is detected in the data set.

* * * * *